United States Patent
Figoli (10) Patent No.: US 7,737,671 B2
(45) Date of Patent: Jun. 15, 2010

(54) SYSTEM AND METHOD FOR IMPLEMENTING HIGH-RESOLUTION DELAY

(75) Inventor: David A. Figoli, Missouri, TX (US)

(73) Assignee: Texas Instruments Incorporated, Dallas, TX (US)

( * ) Notice: Subject to any disclaimer, the term of this patent is extended or adjusted under 35 U.S.C. 154(b) by 521 days.

(21) Appl. No.: 11/605,061

(22) Filed: Nov. 28, 2006

(65) Prior Publication Data

US 2007/0126410 A1  Jun. 7, 2007

Related U.S. Application Data

(60) Provisional application No. 60/742,337, filed on Dec. 5, 2005.

(51) Int. Cl.
  *G05F 1/00*  (2006.01)
(52) U.S. Cl. .................................. 323/282; 323/283
(58) Field of Classification Search ................. 323/282, 323/283, 284, 271, 241
  See application file for complete search history.

(56) References Cited

U.S. PATENT DOCUMENTS

| | | | |
|---|---|---|---|
| 4,079,251 A | 3/1978 | Osann, Jr. | |
| 4,300,080 A | 11/1981 | Lee | |
| 4,914,399 A | 4/1990 | Doany | |
| 5,684,423 A | 11/1997 | Koyashiki et al. | |
| 5,977,801 A | 11/1999 | Boerstler | |
| 6,175,605 B1 | 1/2001 | Chi | |
| 6,333,654 B1 | 12/2001 | Harris et al. | |
| 6,339,350 B1 | 1/2002 | Tanaka | |
| 6,396,250 B1 * | 5/2002 | Bridge | 323/283 |
| 7,071,751 B1 | 7/2006 | Kaviani | |
| 7,176,663 B2 * | 2/2007 | Takimoto et al. | 323/224 |
| 2002/0167360 A1 | 11/2002 | Smith | |
| 2004/0150445 A1 * | 8/2004 | Gomm et al. | 327/158 |
| 2005/0184778 A1 * | 8/2005 | Figoli | 327/172 |
| 2006/0109038 A1 | 5/2006 | Easwaran | |
| 2006/0188048 A1 | 8/2006 | Suzuki et al. | |
| 2006/0195713 A1 | 8/2006 | Johnson et al. | |

* cited by examiner

*Primary Examiner*—Bao Q Vu
*Assistant Examiner*—Nguyen Tran
(74) *Attorney, Agent, or Firm*—William B. Kemplar; Wade J. Brady, III; Frederick J. Telecky, Jr.

(57) ABSTRACT

A system and method is provided for providing a deadband switching time delay. One embodiment of the present invention includes a switching regulator system. The switching regulator system includes a control circuit configured to alternately activate a high-side power switch and a low-side power switch of the switching regulator system. The switching regulator system also includes a switching delay element configured to provide a switching deadband associated with a logic state transition delay of at least one of the high-side power switch and the low-side power switch, the delay element comprising a programmable coarse delay element to provide a course delay amount and a programmable fine delay element to provide a fine delay amount.

13 Claims, 4 Drawing Sheets

SYSTEM AND METHOD FOR IMPLEMENTING HIGH-RESOLUTION DELAY

RELATED APPLICATIONS

The present invention claims priority from U.S. Provisional Patent Application No. 60/742,337 filed Dec. 5, 2005.

TECHNICAL FIELD

This invention relates to electronic circuits, and more specifically to a system and method for implementing a high-resolution delay.

BACKGROUND

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices so that the battery life is extended. Voltage regulators have been implemented as an efficient mechanism for providing a regulated output in power supplies. One such type of regulator is known as a switching regulator or switching power supply, which controls the flow of power to a load through pulse-width modulation (PWM), such as can occur by controlling the on and off duty-cycle of one or more switches coupled to the load. Many different classes of switching regulators exist today.

One type of switching regulator is known as a synchronous switching regulator. In a synchronous switching regulator, an inductor is used to maintain current flow that is switched from two separate sources. The two sources can include a high-side switch, such as a high-side field-effect transistor (FET), and a low-side switch, such as a low-side FET and a freewheeling diode. Once the high-side FET is turned off, magnetic power stored in the inductor dissipates to force current through the inductor by changing the voltage of the inductor source node to negative relative to ground. The freewheeling diode thus conducts current from ground to the inductor after the high-side has been turned off and before the low-side FET has been turned on. In this way, current continuously flows through the inductor in the times between activation of the high-side and the low-side switches.

In a synchronous switching regulator, the activation of the high-side switch and the low-side switch is kept mutually exclusive to avoid shoot-through, which is a short circuit of a positive supply voltage to a negative supply voltage (e.g., ground) that can occur through simultaneous activation of both the high-side switch and the low-side switch. As such, a time delay known as a deadband time can be introduced into the PWM control, such that a rising-edge and/or a falling-edge can be delayed to prevent simultaneous activation of the high-side and the low-side switches. Typically, the amount of deadband time delay can be based on a system clock. However, such deadband time delays are typically configured for a conservative amount of time because a system clock may not be able to provide sufficient resolution for optimum switching efficiency.

SUMMARY

One embodiment of the present invention comprises a switching regulator system. The switching regulator system includes a control circuit configured to alternately activate a high-side power switch and a low-side power switch of the switching regulator system. The switching regulator system also includes a switching delay element configured to provide a switching deadband associated with a logic state transition delay of at least one of the high-side power switch and the low-side power switch, the delay element comprising a programmable coarse delay element to provide a course delay amount and a programmable fine delay element to provide a fine delay amount.

Another embodiment of the present invention can include a method comprising setting a deadband time delay of a switching delay element and programming a coarse delay element to provide a coarse delay amount and programming a fine delay element to provide a fine delay amount based on the setting of the deadband time delay. The method can also comprise delaying a logic state transition associated with at least one of a high-side switch and a low-side switch by the coarse delay amount and the fine delay amount.

Another embodiment of the present invention can include a switching regulator system. The switching regulator system can comprise means for alternately activating a high-side power switch and a low-side power switch to control a magnitude of voltage of the switching regulator system. The switching regulator system can also comprise means for providing a programmable switching deadband associated with a logic state transition delay associated with at least one of the high-side power switch and the low-side power switch. The means for providing can comprise means for providing a coarse delay amount of the logic state transition delay and means for providing a fine delay amount of the logic state transition delay.

DETAILED DESCRIPTION

The present invention relates to electronic circuits, and more specifically to a system and method for implementing a high-resolution delay. A programmable delay amount is provided to at least one switching delay element. The switching delay element can be separately configured to include a coarse delay amount and a fine delay amount, each configured independently of a clock signal. The coarse delay amount can be associated with a number of oscillations associated with a ring oscillator, with each oscillation having an associated coarse delay unit of time. The fine delay amount can be associated with a number of matched delay elements coupled in series, each representing a fine delay unit, such that a multiplexer can select the number of matched delay elements in a series path. The delay amount can be sequential, such that a rising-edge or a falling-edge can be delayed by the coarse delay amount first, followed by the fine delay amount. A calibration circuit can calculate a scale factor based on a system clock, such that an absolute delay amount can be determined that is independent of process and temperature variations. It is to be understood that, as used herein, the terms "coarse delay unit" and "fine delay unit" are intended to refer to units of time delay.

Figure 1:
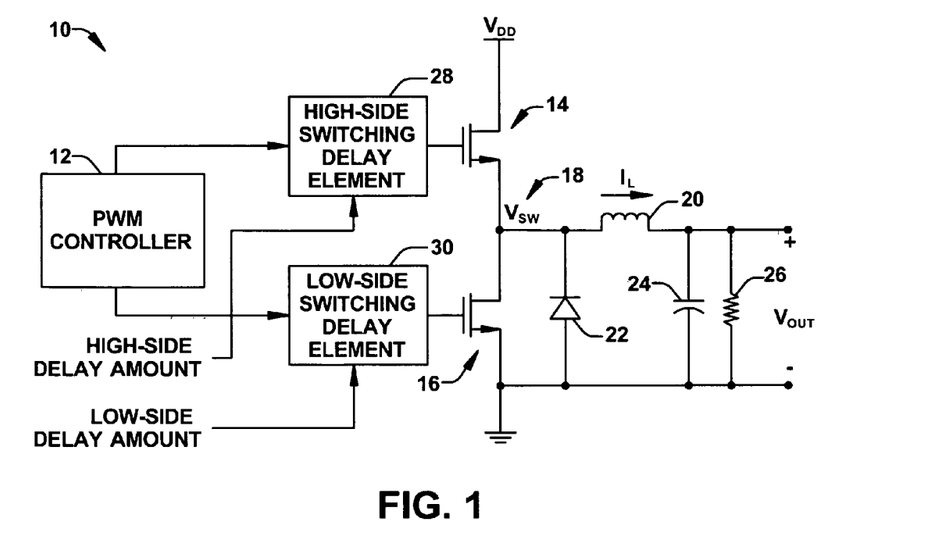
FIG. 1 illustrates an example of a switching regulator in accordance with an aspect of the invention.

FIG. 1 illustrates a switching regulator 10 in accordance with an aspect of the invention. The switching regulator 10 includes a pulse-wide modulation (PWM) controller 12 configured to alternately activate a high-side switch 14 and a low-side switch 16, demonstrated in the example of FIG. 1 as N-type field-effect transistors (FETs). It is to be understood, however, that the high-side switch 14 and a low-side switch 16 are not limited to N-FETs in the example of FIG. 1. The PWM controller 12 is thus configured to control the duty cycle of pulses provided to both the high-side switch 14 and the low-side switch 16. As an example, the PWM controller 12 can provide a square wave switching signal to each of the high-side switch 14 and the low-side switch 16.

The high-side switch 14 has a drain terminal that is connected to a voltage source $V_{DD}$, and the low-side switch 16 has a source terminal connected to a negative supply voltage, demonstrated in the example of FIG. 1 as ground. A source terminal of the high-side switch 14 and a drain terminal of the low-side switch 16 share a common node 18, with a respective voltage $V_{SW}$. An inductor 20 is interconnected between the node switch and an output terminal for the switching regulator 10, the output terminal having a voltage of $V_{OUT}$. A freewheeling diode 22 is interconnected between the node 18 and ground, with an anode connected to ground and a cathode connected to the node 18.

When the controller 12 activates the high-side switch 14, the gate of the high-side switch 14 is pulled higher than the source, turning the high-side switch 14 on. When the high-side switch 14 is on, the source-to-drain input impedance is reduced and the voltage $V_{SW}$ is pulled-up approximately equal to the voltage $V_{DD}$. When the voltage $V_{SW}$ is approximately equal to the voltage $V_{DD}$, an inductor current $I_L$ through the inductor 20 begins to increase. The current $I_L$ continues to increase until the voltage $V_{SW}$ changes.

When the controller 12 deactivates the high-side switch 14, the current $I_L$ through the inductor 20 tends to remain unchanged. Thus, the voltage $V_{SW}$ becomes negative relative to ground so that the current $I_L$ can be supplied through the freewheeling diode 22. Current continues to flow through the freewheeling diode 22 until the PWM controller 12 activates the low-side switch 16. Once the low-side switch 16 becomes activated, the gate of the low-side switch 16 is pulled higher than the source, turning the low-side switch 16 on. When the low-side switch 16 is on, the source-to-drain input impedance is reduced and $V_{SW}$ is pulled down approximately equal to ground. Accordingly, the switching regulator 10 operates to maintain the current flow $I_L$ through the inductor 20, thus maintaining an approximately constant voltage $V_{OUT}$ across a capacitor 24 and a load resistor 26.

To maintain mutual exclusion between the switching of the high-side switch 14 and the low-side switch 16, such as to prevent shoot-through (i.e., a short circuit between the voltage $V_{DD}$ and ground), the switching regulator 10 includes a high-side switching delay element 28 and a low-side switching delay element 30. The high-side switching delay element 28 can be provided with a predetermined high-side delay amount, such that activation and/or deactivation of the high-side switch 14 can be delayed by the predetermined high-side delay amount. Likewise, the low-side switching delay element 30 can be provided with a predetermined low-side delay amount, such that activation and/or deactivation of the low-side switch 16 can be delayed by the predetermined low-side delay amount. The predetermined delay amounts can be fixed, or can be provided dynamically by a user or through software, as may be suited for the switching application. The predetermined delay amounts can be configured independently of each other, such as different for each of the high-side switching delay element 28 and the low-side switching delay element 30. In addition, for a given one of the high-side switching delay element 28 and the low-side switching delay element 30, rising-edge and/or falling-edge delay amounts can be separately configured.

Figure 2:
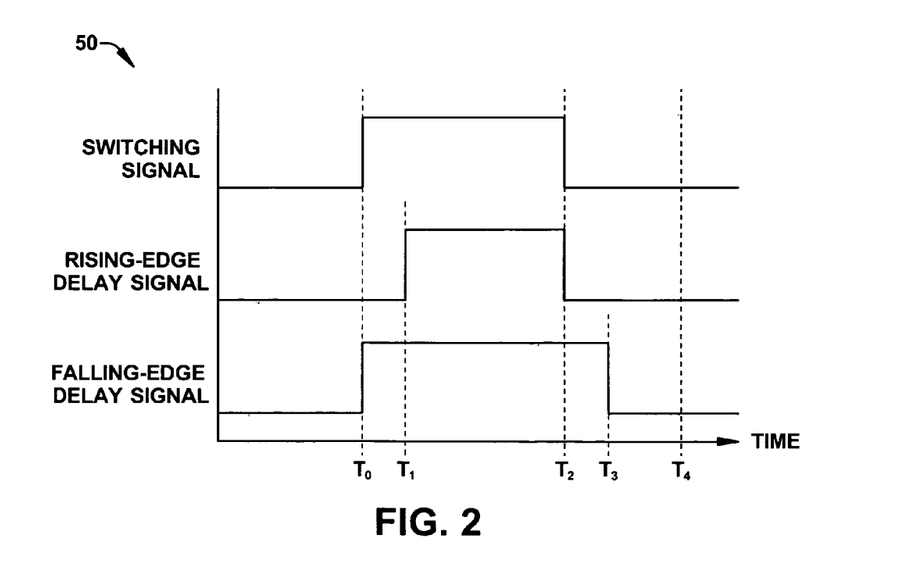
FIG. 2 illustrates a timing diagram in accordance with an aspect of the invention.

FIG. 2 illustrates a timing diagram 50 in accordance with an aspect of the invention. In the example of FIG. 2, reference is to be made to the switching regulator 10 in the example of FIG. 1. The timing diagram 50 demonstrates a switching signal, such as can be provided by the PWM controller 12 to either the high-side switching delay element 28 and the low-side switching delay element 30. In the example of FIG. 2, the switching signal has a rising-edge beginning at a time $T_0$ and ending at a time $T_2$, and thus has a pulse width of $T_2$-$T_0$. The timing diagram 50 also demonstrates a rising-edge delay signal, such as can be output from the high-side switching delay element 28 and/or the low-side switching delay element 30 to either the high-side switch 14 and/or the low-side switch 16, respectively. In the example of FIG. 2, the rising-edge delay signal has a rising-edge beginning at a time $T_1$ and ending at the time $T_2$, and thus has a pulse width of $T_2$-$T_1$. Therefore, the rising-edge delay signal has a rising-edge that is delayed from the switching signal by an amount of time equal to $T_1$-$T_0$.

As an example, the PWM controller 12 can be configured to provide switching signal pulses alternately to the high-side switching delay element 28 and the low-side switching delay element 30 without delays relative to each other. For example, a switching signal pulse provided to the high-side switching delay element 28 can have a falling-edge at the time $T_0$ and a switching signal pulse provided to the low-side switching delay element 30 can have a rising-edge at the time $T_0$. Therefore, the low-side switching delay element 30 can output the rising-edge delay signal to the low-side switch 16, thus delaying activation of the low-side switch 16 to prevent shoot-through. The high-side switching delay element 28 can be configured substantially the same. Accordingly, a deadband time delay of $T_1$-$T_0$ can be introduced between the activation of each of the high-side switch 14 and the low-side switch 16, such that neither the high-side switch 14 nor the low-side switch 16 is activated during the deadband time delay.

The timing diagram 50 also demonstrates a falling-edge delay signal, such as can be output from the high-side switching delay element 28 and/or the low-side switching delay element 30 to either the high-side switch 14 and/or the low-side switch 16, respectively. In the example of FIG. 2, the falling-edge delay signal has a rising-edge beginning at a time $T_0$ and ending at the time $T_3$, and thus has a pulse width of $T_3$-$T_0$. Therefore, the falling-edge delay signal has a falling-edge that is delayed from the switching signal by an amount of time equal to $T_3$-$T_2$.

As an example, the PWM controller 12 can be configured to provide switching signal pulses alternately to the high-side switching delay element 28 and the low-side switching delay element 30 with a fixed amount of delay relative to each other. For example, a switching signal pulse provided to the high-side switching delay element 28 can have a falling-edge at the time $T_2$ and a switching signal pulse provided to the low-side switching delay element 30 can have a rising-edge at a time $T_4$. Therefore, the high-side switching delay element 28 can output the falling-edge delay signal to the high-side switch 14, thus delaying deactivation of the high-side switch 14, such as to shorten the delay between activation of the high-side switch 14 and the low-side switch 16, thus providing more efficient switching to provide the output voltage $V_{OUT}$ from the switching regulator 10. The low-side switching delay element 30 can be configured substantially the same. Accordingly, a shortened deadband time delay of $T_4$-$T_3$, as opposed to the time delay of $T_4$-$T_2$, can be introduced between the activation of each of the high-side switch 14 and the low-side switch 16. Thus, neither the high-side switch 14 nor the low-side switch 16 is activated during the deadband time delay, and the deadband delay between activation of the high-side switch 14 and the low-side switch 16 is reduced for greater switching efficiency in providing the output voltage $V_{OUT}$.

As described above, it is to be understood that the switching regulator 10 in the example of FIG. 1 is not limited to the use of N-FETs for the high-side switch 14 and the low-side switch 16. For example, the high-side FET 14 and/or the low-side FET 16 can be configured instead as P-FETs. As such, the high-side switching delay element 28 and/or the low-side switching delay element 30 can provide inversion of the switching signal and/or implement the rising-edge delay signal and/or the falling-edge signal in a variety of different ways, as may be suitable for the application.

The high-side switching delay element 28 and the low-side switching delay element 30 can provide the respective time delays independently of a system clock, as is demonstrated in greater detail below. As such, the high-side switching delay element 28 and the low-side switching delay element 30 can achieve time delay amounts of a much higher resolution (e.g., 500 picoseconds (pS)) than can be accomplished using a system clock. The delay amounts for each of the high-side switching delay element 28 and the low-side switching delay element 30 can be individually programmable, and can be configured as separate coarse and fine delay amounts, as also described in greater detail below.

It is to be understood that the switching regulator 10 in the example of FIG. 1 is but one example of a switching regulator in accordance with an aspect of the invention. For example, one or more of the components demonstrated in the example of FIG. 1 can be integrated, such as the high-side switching delay element 28, the low-side switching delay element 30, and/or the PWM controller 12. In addition, the switching regulator 10 illustrated in the example of FIG. 1 is simplified in that it may not be inclusive of all circuit components and supply voltages that may be required for the proper functionality of a typical switching regulator circuit. These components and voltages have been omitted from the discussion of FIG. 1 for the sake of simplicity, as they are not necessary for adequately explaining the functionality of the switching regulator 150 in accordance with an aspect of the invention. FIG. 1 is merely a demonstration that deadband delay can be utilized for both high-side switching and low-side switching in accordance with an aspect of the invention.

Figure 3:
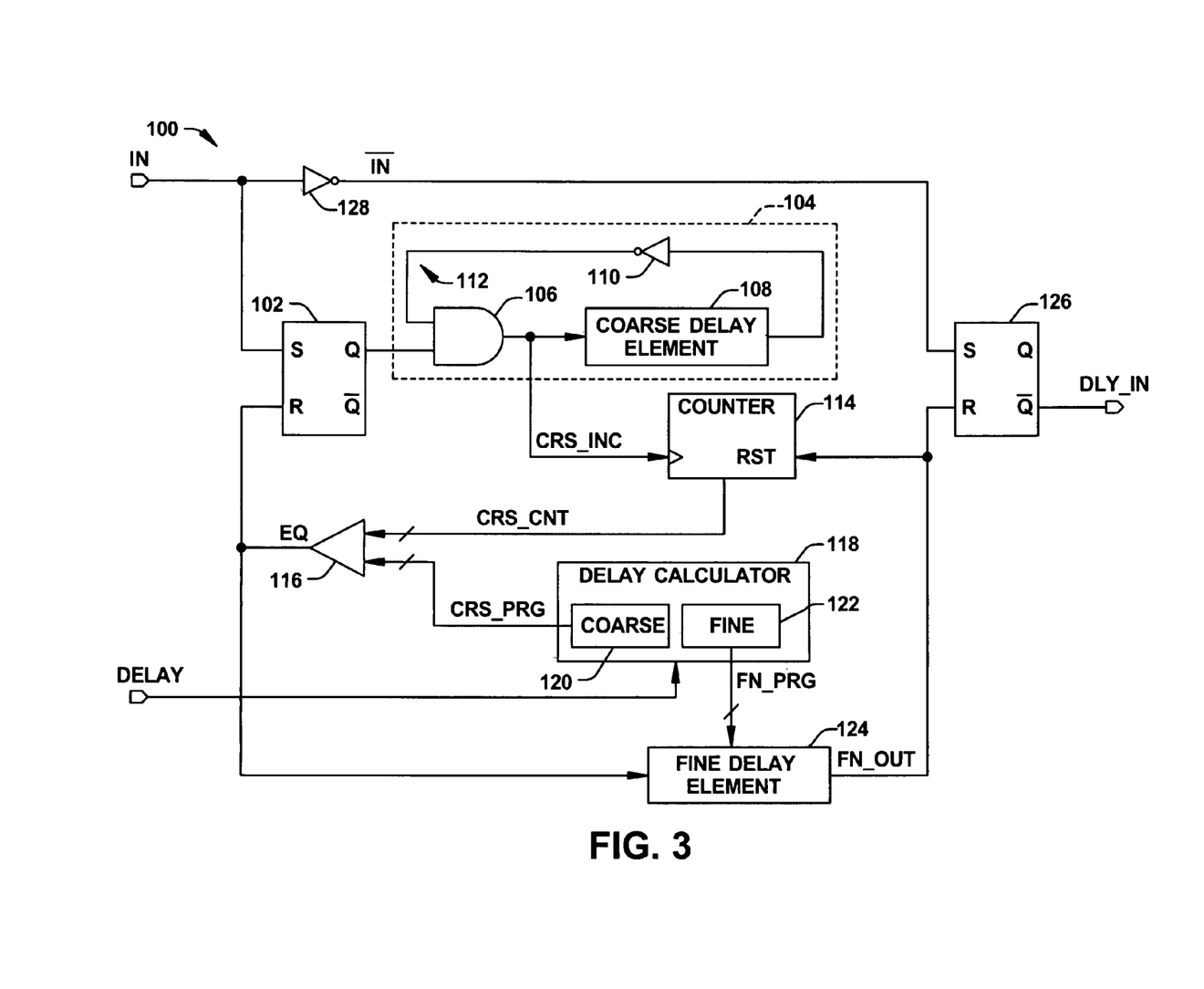
FIG. 3 illustrates an example of a switching delay element in accordance with an aspect of the invention.

FIG. 3 illustrates an example of a switching delay element 100 in accordance with an aspect of the invention. The switching delay element 100 can be either the high-side switching delay element 28 or the low-side switching delay element 30. Thus, reference will be made to the switching delay element 10 in the example of FIG. 1 and the timing diagram 50 in the example of FIG. 2. In addition, as will be demonstrated further below, the switching delay element 100 in the example of FIG. 3 is configured to delay a rising-edge of a switching signal, such as to produce the rising-edge delay signal in the example of FIG. 2. However, it is to be understood that the switching delay element 100 in the example of FIG. 3 can be alternatively configured to delay a falling-edge without extensive modification. In addition, the switching delay element 100 can be included in one of the high-side switching delay element 28 and the low-side switching delay element 30 to delay a rising-edge of a switching signal, along with a separate switching delay element circuit included in the respective one of the high-side switching delay element 28 and the low-side switching delay element 30 configured to delay a falling-edge of the switching signal. As such, the one of the high-side switching delay element 28 and the low-side switching delay element 30 can be selectively configured to delay a rising-edge and/or a falling-edge of the switching signal.

The switching delay element 100 receives an input signal IN, which can be the switching signal in the example of FIG. 2. The input signal IN is provided to a latch 102, demonstrated in the example of FIG. 3 as an SR-latch, such that the input signal IN is provided to the S (i.e., SET) input of the latch 102. Upon a rising-edge of the input signal IN, the latch 102 outputs a logic 1 from the Q output of the latch 102 to activate a ring oscillator 104. The ring oscillator 104 includes an AND-gate 106, a coarse delay element 108, and an inverter 110. The coarse delay element 108 can include any of a variety of delay devices, such as one or more logic buffers. In addition, as is demonstrated in greater detail below, the coarse delay element 108 can be configured to provide a specific amount of delay relative to a predetermined fine delay amount.

The logic 1 output from the Q output of the latch 102 is provided to a first input terminal of the AND-gate 106. The other input terminal of the AND-gate 106 is provided from a node 112 that is the output of the inverter 110, such that the node 112 is held at a logic 1 state prior to the activation of the ring oscillator 104 by the logic 1 state output from the latch 102. As such, the AND-gate 106 provides a logic 1 output signal CRS_INC that is input to the coarse delay element 108. The delayed output signal CRS_INC is then provided to the inverter 110, such that the node 112 changes to a logic 0 state, which subsequently provides a logic 0 state at the output of the AND-gate 106. Accordingly, the ring oscillator 104 toggles the signal CRS_INC between a logic 0 state and a logic 1 state at each oscillation.

The signal CRS_INC is provided to an input of a counter 114, such that the counter 114 increments at every rising-edge of the signal CRS_INC. The counter 114 provides an output signal CRS_CNT that corresponds to the number of counts in the counter 114, and thus the number of oscillation periods of the ring oscillator 104 (i.e., number of rising-edges of the CRS_INC signal). The signal CRS_CNT is provided to a digital comparator 116.

The switching delay element 100 also includes a delay calculator 118. The delay calculator 118 receives a signal DELAY as an input. The signal DELAY can be representative of an amount of delay for which the switching delay element 100 is to provide. For example, the signal DELAY can be an analog signal, such as provided by a trim potentiometer, such that the delay calculator 118 is configured to convert the signal DELAY into a digital value. As another example, the signal DELAY can be a digital value provided manually or automatically via software or firmware, or can be a fixed value.

The delay calculator 118 can separate the amount of delay provided in the signal DELAY into a coarse delay amount 120 and a fine delay amount 122. Alternatively, the signal DELAY can provide the coarse delay amount 120 and the fine delay amount 122, such that the delay calculator 118 is a memory for storing the respective coarse delay amount 120 and fine delay amount 122. The coarse delay amount 120 can include an integer number of coarse delay units, each corresponding to a specific delay amount. For example, each of the coarse delay units can correspond to twice the amount of delay associated with the coarse delay element 108. As another example, the fine delay amount 122 can include an integer number of fine delay units, each corresponding to a specific delay amount. As is demonstrated in greater detail below, each of the coarse delay units can have a delay time that is approximately equal to an integer multiple of a delay time associated with the fine delay units. As such, the coarse delay units and the fine delay units can collectively be configured as a vernier scale.

The coarse delay amount 120 is output from the delay calculator 118 as a signal CRS_PRG. For example, the signal CRS_PRG can be a digital signal having a value equal to a predetermined number of coarse delay units. In the example of FIG. 3, the signal CRS_PRG is provided to the digital comparator 116, along with the signal CRS_CNT. Upon the signal CRS_CNT being equal to the signal CRS_PRG, the digital comparator 116 outputs a signal EQ having a logic 1 state. Therefore, the digital comparator 116 provides a logic 1 signal EQ upon the number of oscillation periods of the ring oscillator 104, as dictated by the signal CRS_CNT, being equal to the number of predetermined coarse delay units, as dictated by the signal CRS_PRG. Thus, each of the predetermined coarse delay units is approximately equal to an oscillation period, or approximately twice a delay amount associated with the coarse delay element 108. It is to be understood that, in the above described example, an offset of one can be negatively applied to the signal CRS_CNT or positively applied to the signal CRS_PRG, as the counter 114 outputs a value of one on the signal CRS_CNT at activation of the ring oscillator 104, before application of any delay by the coarse delay element 108. It is also to be understood that the counter 114 could instead be configured to count oscillations of the ring oscillator 104, instead of rising edges. As such, the coarse delay amount 120 could include a digital value corresponding to a number of oscillations, and not coarse delay units that are representative of an oscillation period of the ring oscillator 104.

The signal EQ is provided to the R (i.e., RESET) input of the latch 102, such that the output Q of the latch 102 switches to a logic 0 state, thus deactivating the ring oscillator 104. In addition, the signal EQ is provided to a fine delay element 124. The fine delay element 124 also receives the fine delay amount 122 as an input, demonstrated in the example of FIG. 3 as the signal FN_PRG. For example, the signal FN_PRG can be a digital signal having a value equal to a predetermined number of fine delay units. The fine delay element 124 thus applies the fine delay amount 122, as dictated by the signal FN_PRG, to the signal EQ to provide the delayed signal FN_OUT. In addition, as the signal EQ is delayed from the rising-edge of the input signal IN by the coarse delay amount 120, the signal FN_OUT is delayed from the rising-edge of the input signal IN by both the coarse delay amount 120 and the fine delay amount 122. Accordingly, the signal FN_OUT is delayed from the rising-edge of the input signal IN by the predetermined amount of delay in the signal DELAY.

Figure 4:
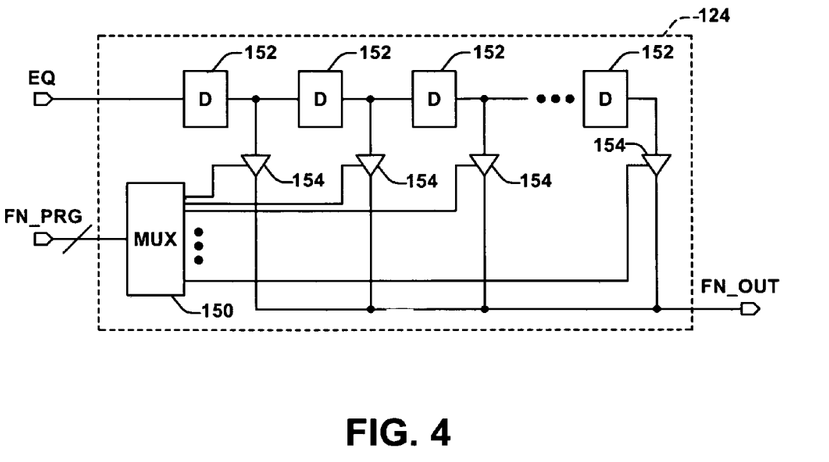
FIG. 4 illustrates a fine delay element in accordance with an aspect of the invention.

FIG. 4 illustrates the fine delay element 124 in accordance with an aspect of the invention. As the example of FIG. 4 demonstrates the fine delay element 124 from the example of FIG. 3, reference is to be made to the example of FIG. 3. The fine delay element 124 includes a multiplexer 150 and a plurality of matched delay elements 152. The matched delay elements 152 can each have an associated amount of delay D that is substantially equal with respect to each other. For example, each of the matched delay elements 152 can be configured to provide an amount of delay D that is approximately equal to 500 pS. The matched delay elements 152 can be configured from any of a variety of delay devices, such as one or more logic buffers.

In the example of FIG. 4, the matched delay elements 152 are configured in series with respect to each other, with the first of the matched delay elements 152 receiving the signal EQ as an input. Each of the matched delay elements 152 can provide an amount of delay D that is approximately equal to the amount of delay associated with a fine delay unit. Each of the matched delay elements 152 also provides an output to a switch 154 that is activated by one of a plurality of outputs of the multiplexer 150. As an example, each of the switches 154 can be a FET, or any of a variety of other switching devices. The signal FN_PRG is provided to the multiplexer 150. As such, the multiplexer 150 can provide a single output that corresponds to the one of the matched delay elements 152 corresponding to the number of fine delay units, as dictated by the signal FN_PRG, along a series connection of the matched delay elements 152 to the respective one of the switches 154. As such, the signal EQ is delayed by the series path of the number of matched delay elements 152 corresponding to the number of fine delay units dictated by the signal FN_PRG to the output signal FN_OUT. As an example, if the signal FN_PRG indicates seven fine delay units, the multiplexer 150 activates the seventh switch 154. Thus, the signal EQ passes through a series connection of seven matched delay elements 152 and is delayed by an amount 7*D and output as the signal FN_OUT.

As described above, a given coarse delay unit, such as associated with twice the amount of delay of the coarse delay element 108, can be approximately equal to an integer multiple N of fine delay units, such that a coarse delay unit is equal to N fine delay units. As such, because the delay amount D of each of the matched delay elements 152 is a fine delay unit, a course delay unit can be approximately equal to an integer multiple N of the time delay amount D. For example, for N=16, a coarse delay unit can be approximately equal to 16*D. Therefore, the combination of coarse delay and fine delay amounts can be implemented to create a vernier scale of delay in increments of the delay amount D. Accordingly, the fine delay element 124 can include N−1 matched delay elements 152, such that any delay amount in increments of D can be implemented. Such an integer multiple between coarse delay amounts and fine delay amounts can result from matched electrical characteristics, such as resulting from semiconductor fabrication from the same process and material. Thus, a coarse delay unit is substantially always equal to the N fine delay units, regardless of process and temperature variations.

It is to be understood that the additional switching devices in the switching delay element 100 in the example of FIG. 3, aside from the coarse delay element 108 and the fine delay element 124, can also contribute to an amount of time delay. For example, in the ring oscillator 104, the AND-gate 106 and the inverter 110 can also contribute to a time delay associated with each oscillation of the ring oscillator 104. Accordingly, the coarse delay element 108 can be configured to compensate for the amount of delay contributed by the AND-gate 106 and the inverter 110, such that a coarse delay unit (i.e., two oscillations of the ring oscillator 104) remains approximately equal to the integer multiple N of fine delay units. For example, the coarse delay element 108 can be configured to include an amount of filler delay (e.g., via any of a variety of delay devices) that, when added to the amount of delay provided by the inverter 110 and AND-gate 106, provides an amount of delay D (i.e., a fine delay unit). The switching devices contributing to the filler delay can likewise be fabricated from the same semiconductor material as the matched delay elements 152 and coarse delay element 108 to account for process and temperature variations. Therefore, one oscillation of the ring oscillator 104 can include an amount of delay contributed by the coarse delay element 108, including filler delay, the AND-gate 106, and the inverter 110, such that the one oscillation remains substantially equal to N/2 fine delay units.

With regard to the example of FIG. 4, it is to be understood that the fine delay element 124 is not intended to be limited by the example of FIG. 4. As an example, any of a variety of other configurations of matched delay elements 152, as well as selection circuitry, can be implemented to apply the fine delay amount 122 to the signal EQ.

Referring back to FIG. 3, the switching delay element 100 includes a latch 126, demonstrated in the example of FIG. 3 as an SR-latch. The input signal IN is inverted, via an inverter 128, and the inverted input signal IN' is provided to the S (i.e., SET) input of the latch 126. Upon a rising-edge of the input signal IN, the latch 126 maintains a logic 0 state from the Q' output. The signal FN_OUT is provided to a reset input RST on the counter 114 to reset the number of counts, thus forcing the signal CRS_CNT to a value of zero. In addition, the signal FN_OUT is provided to the R (i.e., RESET) input of the latch 126. Upon the logic 1 state of the FN_OUT signal being input to the latch 126, the latch 126 provides a logic 1 from the Q' output of the latch 126 as a signal DLY_IN. Therefore, the signal DLY_IN has a rising-edge that is delayed from the rising-edge of the input signal IN by the predetermined delay amount, as dictated by the signal DELAY. It is to be understood that the order of implementation of the switching delay element 100 is not limited to the example of FIG. 3. For example, the switching delay element 100 could be configured to apply the fine delay amount 122 first, followed by the coarse delay amount 120. As such, the switching delay element 10Q in the example of FIG. 3 is but one example implementation of providing a deadband delay to a switching signal.

Figure 5:
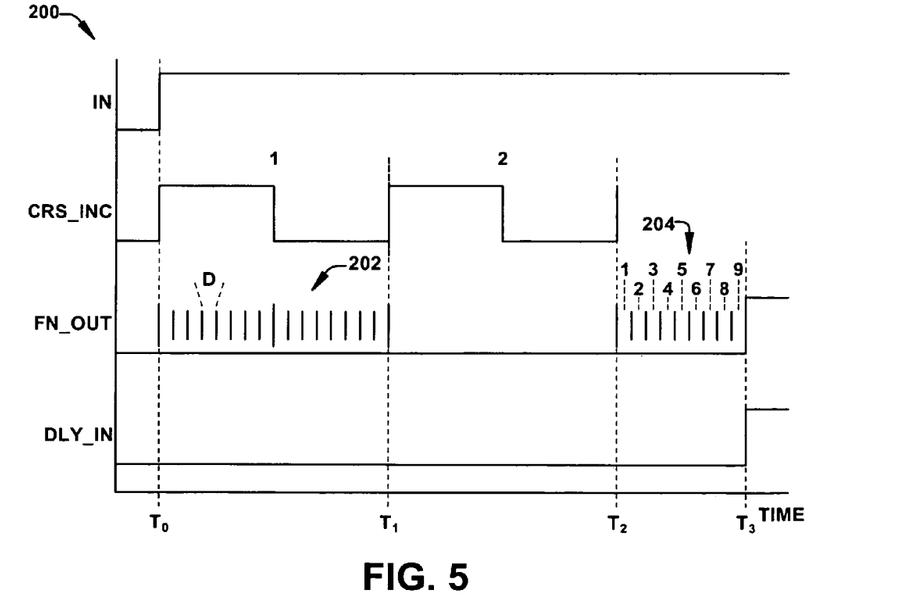
FIG. 5 illustrates a timing diagram demonstrating coarse and fine delay in accordance with an aspect of the invention.

FIG. 5 illustrates a timing diagram 200 in accordance with an aspect of the invention. The timing diagram 200 can be a timing diagram representing timing associated with the switching delay element 100 in the example of FIG. 3. As such, reference is to be made to the examples of FIGS. 3 and 4. In addition, in the example of FIG. 5, it is to be assumed that the amount of delay D, associated with each fine delay unit, is approximately 500 pS, and that each coarse delay unit is approximately equal to 16*D (e.g., 8 nanoseconds (nS)), as demonstrated at 202 in the example of FIG. 5. In the example of FIG. 5, the signal DELAY is provided to the switching delay element 100 and has a delay amount set for 20.5 nS. The delay calculator 118 may thus calculate and store two coarse delay units in the coarse delay amount 120 and nine fine delay units in the fine delay amount 122.

The timing diagram 200 demonstrates a rising-edge of the input signal IN at a time $T_0$. As such, the latch 102 provides a logic 1 state at the Q output of the latch 102 that activates the ring oscillator 104. The timing diagram 200 demonstrates a rising-edge of the signal CRS_INC at the time $T_0$. As demonstrated in the example of FIG. 5, the ring oscillator 104 oscillates four times for a total of two oscillation periods, the first beginning at the time $T_0$ and the second beginning at the time $T_0$. Each of the oscillation periods thus corresponds to a coarse delay unit (i.e., 8 nS).

At the time $T_2$, the signal CRS_CNT becomes equal to the signal CRS_PRG, thus corresponding to the predetermined coarse delay amount 120. For example, the CRS_PRG can be equal to three (e.g., 1+the two predetermined coarse delay units), and thus the signal CRS_CNT becomes equal to the signal CRS_PRG on the third rising-edge at the time $T_2$. Therefore, the signal EQ is switched to a logic 1 state and is input to the fine delay element 124. The signal FN_PRG is likewise input to the fine delay element 124, and can have a digital value that is indicative of the predetermined fine delay units (e.g., 9). As such, the multiplexer 150 provides an output to the ninth switch 154, such that the signal EQ passes through a series path of nine matched delay elements 152, demonstrated in the example of FIG. 5 as a rising-edge of the signal FN_OUT at a time $T_3$. In the example of FIG. 5, a fine delay amount is demonstrated at 204 between the times $T_2$ and $T_3$ as nine separate fine delay units. Therefore, at the time $T_3$, the signal DLY_IN has a rising-edge which is delayed from the rising-edge of the input signal IN by two coarse delay units and nine fine delay units, for a total delay amount of approximately 20.5 nS. It is to be understood that the fine delay amounts demonstrated at 202 and 204 are representative of the vernier scaling of fine delay units relative to coarse delay units, and is thus not intended to illustrate an effect on the signal FN_OUT. Furthermore, the timing diagram 200 in the example of FIG. 5 is demonstrated as an ideal timing diagram, such that it is to be understood that inherent switching delays may exist aside from those discussed herein.

As demonstrated in the examples of FIGS. 3-5, the amount of delay applied to the input signal IN, be it a delayed rising-edge as demonstrated or a delayed falling-edge, is applied by the switching delay element 100 independently of a system clock. As such, the amount of delay that is applied can have a much finer granularity than can be achieved using a system clock. In addition, the switching delay element 100 only operates during the period of time to which it applies the deadband delay, and is thus static logic at all other times. Therefore, the switching delay element 100 operates with little power consumption. Furthermore, the switching delay element 100 can be included in an integrated circuit (IC), such that it can be integrated with one or more additional components in the switching regulator 10 in the example of FIG. 1. For example, one or more devices in the switching regulator 10 can be integrated with the switching delay element 100, such that the integrated devices can be integrated in or implemented with a microcontroller unit (MCU) for a completely digital PWM implementation in a mobile communication device, such as a cellular phone, or portable electronic device, such as a laptop computer.

As described above, the relative timing between the coarse delay amount 120 and the fine delay amount 122 is substantially unaffected by process and temperature variations because the coarse delay element 108 and the fine delay element 124 can be matched, such as fabricated from the same semiconductor process and material. However, process and temperature variations may still affect the switching delay element 100 relative to one or more other circuit devices in real-time.

Figure 6:
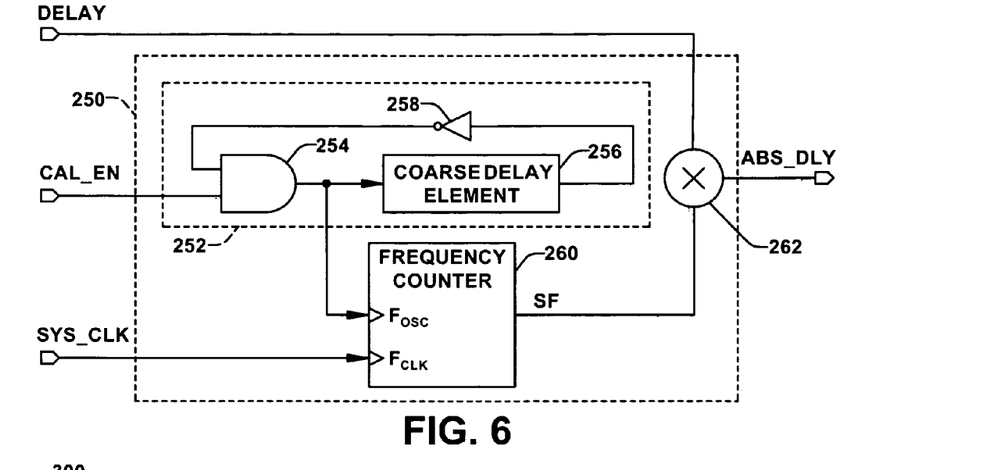
FIG. 6 illustrates an absolute delay calculator in accordance with an aspect of the invention.

FIG. 6 illustrates an absolute delay calculator 250 in accordance with an aspect of the invention. The absolute delay calculator 250 can be configured to provide scaling between the predetermined amount of delay of the switching delay element 100, as dictated by the signal DELAY, and an intended amount of delay in real-time. The absolute delay calculator 250 can be implemented in conjunction with the switching system 100 in the example of FIG. 3. As such, reference is to be made to the example of FIG. 3.

The absolute delay calculator 250 includes a ring oscillator 252 that includes an AND-gate 254, a coarse delay element 256, and an inverter 258. The ring oscillator 252 can be configured substantially identically to the ring oscillator 104 in the example of FIG. 3, such that the coarse delay element 256 and the coarse delay element 108 can be matched, as well as the AND-gates 106 and 254 and the inverters 110 and 258, such as fabricated from the same semiconductor material to provide a substantially equal amount of delay regardless of process and temperature variations. Therefore, like the ring oscillator 104, two oscillations of the ring oscillator 252 can be substantially equal to one coarse delay unit.

The AND-gate 254 receives an input signal CAL_EN that can be asserted to activate the ring oscillator 252. Therefore, the signal CAL_EN can initiate a calibration operation of the delay amount provided by the switching delay element 100 in the example of FIG. 3. As an example, the signal CAL_EN can be asserted manually by an operator, or via software, such that the signal CAL_EN can be initiated at periodic intervals (e.g., every minute), or initiated based on any of a number of events (e.g., power-on).

The absolute delay calculator 250 also includes a frequency counter 260. The frequency counter 260 receives an input $F_{OSC}$ from the ring oscillator 252, such that the frequency counter 260 is configured to calculate a frequency of oscillation of the ring oscillator 252. The frequency counter 260 also receives an input $F_{CLK}$, demonstrated in the example of FIG. 6 as a system clock SYS_CLK. The system clock SYS_CLK can be a clock signal, such as a CPU clock signal, that is generated from a known, stable frequency source, such as from a resonator or crystal. The frequency counter 260 can thus be further configured to compare the frequency of the system clock SYS_CLK with the frequency of oscillations of the ring oscillator 252. Since the frequency of oscillations of the ring oscillator 252 is directly associated with a coarse delay unit, the frequency counter 260 can provide a scale factor between real-time and the delay time associated with a coarse delay unit. The scale factor is output from the frequency counter 260 as the signal SF.

The signal SF is output from the frequency counter 260 and is input to a multiplier 262, along with the signal DELAY. The signal DELAY can be the signal DELAY as demonstrated in the example of FIG. 3, and can thus be representative of an amount of delay for which the switching delay element 100 is intended to provide. The multiplier 262 can multiply the delay amount in the signal DELAY by the scale factor in the signal SF to generate a signal ABS_DLY. Therefore, the signal ABS_DLY can be representative of the amount of delay intended in the signal DELAY in real-time, such that the signal ABS_DLY represents an amount of time that is substantially unaffected by process and temperature variations. The signal ABS_DLY can thus be provided to the delay calculator 118 in the example of FIG. 3, instead of the signal DELAY, such that the calibration of delay amount in the signal DELAY is transparent to the switching delay element 100.

It is to be understood that the absolute delay calculator 250 in the example of FIG. 6 is but one example of how the delay amount provided to the switching delay element 100 can be calibrated to real-time. As such, any of a variety of different configurations can be implemented. In addition, the absolute delay calculator 250 can be integrated with one or more switching delay elements 100, such that the absolute delay calculator 250 can calibrate an amount of time provided to a plurality of switching delay elements 100 with a single calibration operation.

Figure 7:
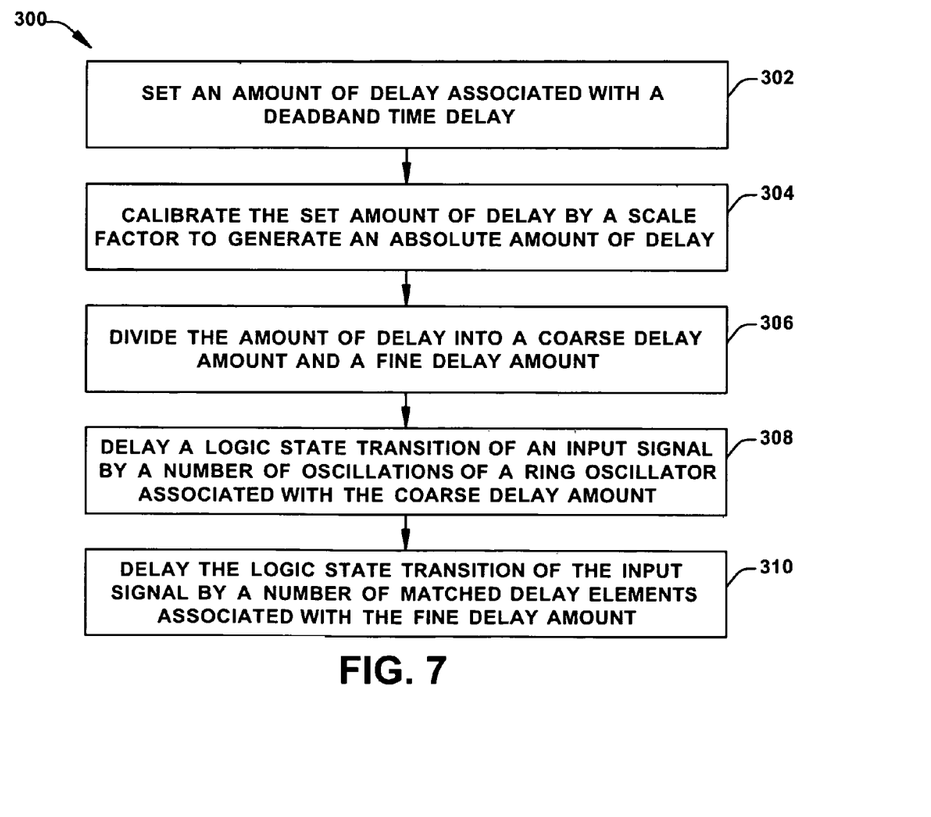
FIG. 7 illustrates a method for providing a deadband time delay in accordance with an aspect of the invention.

In view of the foregoing structural and functional features described above, certain methods will be better appreciated with reference to FIG. 7. It is to be understood and appreciated that the illustrated actions, in other embodiments, may occur in different orders and/or concurrently with other actions. Moreover, not all illustrated features may be required to implement a method.

FIG. 7 illustrates a method 300 for providing a deadband time delay associated with a switching supply in accordance with an aspect of the invention. At 302, an amount of delay associated with a deadband time delay is set. The amount of delay can be provided by a signal, which could be an analog signal or a digital signal. At 304, the set amount of delay is calibrated by a scale factor to generate an absolute amount of delay. The scale factor can be generated from a calibration circuit, such as a circuit that compares a frequency associated with the ring oscillator with a real-time system clock frequency. As such, the absolute delay amount is substantially unaffected by process and temperature variations. At 306, the amount of delay is divided into a coarse amount of delay and a fine amount of delay. The fine amount of delay can include a number of fine delay units (e.g., 500 pS each), and a number of coarse delay units, each equal to an integer multiple of the fine delay units. As such, the coarse delay units and the fine delay units can represent a vernier scale of delay with a resolution to a single fine delay unit.

At 308, a logic state transition of an input signal is delayed by a number of oscillations of a ring oscillator associated with the coarse delay amount. The number of oscillations of the ring oscillator can correspond to a coarse delay unit, such as two oscillations per coarse delay unit. At 310, the logic state transition of the input signal is delayed by a number of matched delay element associated with the fine delay amount. Each matched delay element can correspond to a fine delay unit, such that the logic state transition is delayed through a series path of the number of matched delay elements corresponding to the number of fine delay units. As such, both the coarse delay amount and the fine delay amount can be provided to the logic state transition of the input signal without a system clock.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A switching regulator system comprising:
a control circuit configured to alternately activate a high-side power switch and a low-side power switch of the switching regulator system; and
a switching delay element configured to provide a switching dead band associated with a logic state transition delay of at least one of the high-side power switch and the low-side power switch, the delay element comprising a programmable coarse delay element to provide a course delay amount and a programmable fine delay element to provide a fine delay amount, further comprising a calibration circuit configured to periodically compare a frequency associated with oscillations of the ring oscillator with a system clock, such that the calibration circuit provides a scale factor to a programmable delay amount to generate an absolute delay amount, wherein the absolute delay amount compensates for process and temperature variations of components of the switching regulator system.

2. The switching regulator system of claim 1, wherein the delay amount provided by the coarse delay element and the fine delay element is independent of a clock signal.

3. The switching regulator system of claim 1, wherein the coarse delay element comprises a ring oscillator, a counter, and a comparator, such that the coarse delay amount comprises a number of oscillations of the ring oscillator equal to a predetermined coarse delay digital value as counted by the counter, a digital comparator providing an output to the fine delay element upon a number of counts of the counter being equal to the predetermined coarse delay digital value.

4. The switching regulator system of claim 1, wherein a total delay of the switching delay element is an aggregation of the course delay amount and the fine delay amount.

5. The switching regulator system of claim 1, wherein the fine delay element comprises a multiplexer and a plurality of matched delay elements connected in series, the multiplexer being configured to select a given one of the plurality of matched delay elements corresponding to a predetermined fine delay digital value to provide a series path from an input of the fine delay element through the given one and each proceeding one of the plurality of matched delay elements to an output of the fine delay element.

6. The switching regulator system of claim 1, wherein the coarse delay amount comprises an integer value of substantially equal value coarse delay units and the fine delay amount comprises an integer value of substantially equal value fine delay units, and wherein each coarse delay unit has a delay amount that is substantially equal to an integer multiple of a delay amount associated with the fine delay units.

7. The switching regulator system of claim 6, wherein the integer multiple of the delay amount associated with the fine delay units is N, where N is a positive integer greater than 1, and wherein the fine delay amount comprises up to N−1 fine delay units.

8. A method for providing a deadband switching time delay for a switching regulator system, the method comprising:
    setting a dead band time delay of a switching delay element;
    programming a coarse delay element to provide a coarse delay amount and programming a fine delay element to provide a fine delay amount based on the setting of the dead band time delay; and
    delaying a logic state transition associated with at least one of a high-side switch and a low-side switch by the coarse delay amount and the fine delay amount, wherein the delaying the logic state transition by the coarse delay amount comprises:
    activating a first ring oscillator, each oscillation of the ring oscillator being associated with a coarse delay unit of the coarse delay amount;
    incrementing a counter upon each elapsed coarse delay unit of the coarse delay amount; and
    providing an output from the counter obtaining a value equal to a predetermined coarse delay digital value corresponding to the coarse delay amount;
further comprising:
    activating a second ring oscillator that is substantially identically configured to the first ring oscillator;
    comparing a frequency of oscillations associated with the second ring oscillator with a system clock to determine a scale factor; and
    multiplying the scale factor and the deadband time delay to generate an absolute delay amount, the absolute delay amount substantially compensating for process and temperature variations of components of the switching regulator system.

9. The method of claim 8, wherein delaying the logic state transition comprises delaying the logic state transition independently of a system clock.

10. The method of claim 8, wherein the delaying the logic state transition by the fine delay amount comprises selecting one of a plurality of series-connected matched delay elements based on a predetermined fine delay digital value to provide a series path from an input of the fine delay element through the given one and each proceeding one of the plurality of matched delay elements to an output of the fine delay element, the plurality of matched delay elements each providing a substantially equal amount of delay.

11. A method for providing a deadband switching time delay for a switching regulator system, the method comprising:
    setting a dead band time delay of a switching delay element;
    programming a coarse delay element to provide a coarse delay amount and programming a fine delay element to provide a fine delay amount based on the setting of the dead band time delay; and
    delaying a logic state transition associated with at least one of a high-side switch and a low-side switch by the coarse delay amount and the fine delay amount, wherein the coarse delay amount comprises an integer amount of substantially equal value coarse delay units and the fine delay amount comprises an integer amount of substantially equal value fine delay units, and wherein each coarse delay unit has a delay amount that is substantially equal to an integer multiple of a delay amount associated with the fine delay units.

12. The method of claim 11, wherein the integer multiple of the delay amount associated with the fine delay units is N, where N is a positive integer greater than 1, and wherein the fine delay amount comprises up to N−1 fine delay units.

13. A Switching regulator system comprising:
    means for alternately activating a high-side power switch and a low-side power switch to control a magnitude of voltage of the switching regulator system;
    means for providing a programmable switching deadband associated with a logic state transition delay associated with at least one of the high-side power switch and the low-side power switch, the means comprising:
    means for providing a coarse delay amount of the logic state transition delay;
    means for providing a fine delay amount of the logic state transition delay
    wherein the coarse delay amount comprises an integer amount of substantially equal value coarse delay units and the fine delay amount comprises an integer amount of substantially equal value fine delay units, and wherein each coarse delay unit has a delay amount N, where N is a positive integer greater than 1, that is substantially equal to an integer multiple of a delay amount associated with fine delay units, and wherein the fine delay amount comprises up to N−1 fine delay units.

* * * * *